Patented Dec. 14, 1926.

1,610,854

UNITED STATES PATENT OFFICE.

STANLEY FOWLER, OF YORKSHIRE, AND EDWIN EDSER, OF LONDON, ENGLAND.

PURIFICATION OF WOOL FAT.

No Drawing. Application filed August 13, 1926, Serial No. 129,090, and in Great Britain March 24, 1925.

This invention comprises improvements in the purification of wool-fat. Wool-fat which is an impure form of cholesterol is present in the effluent liquors from the washing of wool, and is associated with numerous impurities some of which are derived from the wool itself, and others derived from the treatment to which the wool is subjected. It can be separated from the effluent liquor by several methods, one of which involves the addition of mineral acid to produce the impure product known as Yorkshire brown grease. Again, the product known as White concentrate separates from wool-washing effluent and forms a scum on the surface thereof when the effluent is allowed to stand. One object of the invention is to provide an improved process of purification which leads to the production of a purified anhydrous body containing cholesterol in a state which renders it peculiarly suitable for employment as a lubricant, or as an ingredient in the lubricating composition described in co-pending application No. 104,833, from which the present application is a continuation in part.

According to the present invention a process for the preparation of pure neutral soap-free wool-fat comprises the steps of first neutralizing a part of the free fatty acids in an aqueous mixture of the crude wool-fat by addition of alkali in quantity insufficient to effect complete neutralization, removing the soaps produced, thereafter effecting further neutralization and removing the soaps produced by the further neutralization. The neutralization of the free fatty acids present in the wool-fat is therefore effected in the present invention in a plurality of stages. By so doing it has been found possible to prevent the formation of emulsions containing large quantities of wool-fat, as well as saponified material. The formation of such emulsions is a serious source of loss in the purification of wool-fat if saponification methods of purification are attempted. On the other hand, unless neutralization of the free fatty acids is effected it is impossible to effectively remove the whole of the fatty acids from the wool-fat. The presence of soaps in the final product prevents a satisfactory dehydration of the product. The present invention therefore provides an economic process for obtaining pure neutral soap-free wool-fat. Moreover, esters insoluble in mineral oils which are present in the wool grease are hydrolyzed in the neutralization steps and removed with the soaps so that the product is freed from esters as well as from fatty acids and soaps. It is, moreover, distinctly more transparent and waxy in character than wool-fats purified by solvent extraction processes. It dissolves completely in mineral oils producing a clear unclouded solution.

In carrying the invention into effect two, three or even four stages of saponification may be employed. One process in accordance with the invention is as follows:—

Crude wool-fat of the kind known as "white concentrate" is employed as the raw material. The concentrate is run into a tank of boiling water at the rate of one and one-half hundred weights of grease to 60 gallons of water, which is preferably soft. This is boiled for ten minutes. Cold water is then added in sufficient amount (about 90 gallons) to reduce the temperature to 46° C. Assuming that the amount of free fatty acid present is such that it would be neutralized by 22 ounces of sodium peroxide, 12 ounces of sodium peroxide are dissolved in three gallons of water and are added to the mixture with stirring. The whole is allowed to stand for twelve hours. It is then boiled to decompose any free sodium peroxide, and to complete the neutralization and facilitate the separation of cholesterol from the liquid matters with which the wool fat has been admixed and from the produced soaps. It is allowed to settle, upon which it separates into a supernatant layer of grease and an aqueous layer containing some grease suspended therein. This aqueous layer is drawn off and centrifuged, whereby this suspended grease is separated from the aqueous layer and it is then returned to the original larger portion of partially purified grease which separated without centrifuging.

The wool-fat (grease) is then washed by boiling with 150 gallons of water, allowed to settle, upon which it separates into a supernatant layer of grease and an aqueous layer containing some grease suspended in it. This aqueous layer is drawn off and centrifuged as before.

Into the partly purified grease is now mixed two thirds of its bulk of water so as to be disseminated evenly therethrough. The temperature is adjusted to 46° C., and 10 ounces sodium peroxide are added, in solution as before, with stirring. This is allowed to stand for twelve hours, then diluted with 50 gallons of water boiled and allowed to settle to separate the larger portion of the grease from the liquid portion. The aqueous layer is drawn off and centrifuged as before, and the grease separated therefrom is returned to the larger portion of grease separated by settling. This whole body of grease is again washed by boiling with water, allowed to settle and the aqueous layer drawn off and centrifuged and the grease separated thereby returned to the larger portion of grease separated by settling as before. The whole bulk of the settled and also the centrifugally recovered grease is then centrifuged to remove most of the water contained in it. The product is the purified wool-fat. "Yorkshire brown grease" can be purified in the same way, but in view of its higher content of fatty acid requires more alkali. Other alkaline reagents, for example caustic soda, can be employed instead of sodium peroxide, especially where it is not desired to bleach the product.

The product is of peculiar purity, as is shown by the fact that on admixture with mineral thinning agents such for example as a mineral lubricating oil it produces no sediment of cloudiness such as is produced on the admixture of ordinary neutralized wool-grease with such a thinning agent. Such sediment or cloudiness in part consists of soaps which are present in neutralized wool-grease as ordinarily prepared. In part, it may also consist of esters insoluble in mineral oils which are largely removed by the present process. Moreover, the product is free from fatty acid and can readily be freed from water by simply heating to 120° C. An analysis of the product gives the following figures:—

Free fatty acid less than 0.5% calculated as oleic acid.

Ash, 0.1% (representing soaps and other impurities).

Water, nil.

We claim:—

1. A process for the preparation of pure neutral soap-free wool-fat from crude wool fat containing free fatty acids which comprises the steps of first neutralizing a part only of the free fatty acids in an aqueous mixture of the crude wool-fat by addition of an alkali in quantity insufficient to effect complete neutralization, removing the soaps produced, thereafter effecting further neutralization and removing the soaps produced in the said further neutralization, such neutralization and removal of soaps being repeated until all the fatty acids are removed together with esters.

2. A process for the recovery of soap free cholesterol from crude wool-fat in which neutralization of contained fatty acids in the crude wool-fat is effected by treatment with aqueous alkaline solutions in successive stages, the quantity of alkali employed in non-final stages being insufficient to effect complete neutralization of the fatty acids, in which soaps produced at non-final stages are removed from the wool-fat by separating the aqueous solution containing them therefrom before proceeding with the next stage of partial neutralization, and in which finally complete neutralization of the remaining small portion of fatty acid is effected by an aqueous alkaline solution and the soaps produced are removed whereby complete neutralization is obtained without emulsification of the cholesterol with the soaps produced.

3. A purified wool-fat preparation consisting essentially of cholesterol free from water, soaps and solid impurities and containing less than 0.5% of free fatty acid, substantially free from esters insoluble in mineral oil and characterized by a translucent waxy consistency and by dissolving to a clear solution without producing cloudiness or sediment in mineral thinning agents.

4. A wool-fat preparation characterized by consisting essentially of cholesterol substantially free from water, soaps and fatty acid and capable of dissolving to a clear solution without producing cloudiness or sediment in mineral thinning agents.

In testimony whereof we affix our signatures.

STANLEY FOWLER.
EDWIN EDSER.